United States Patent [19]
Line

[11] Patent Number: 5,423,237
[45] Date of Patent: Jun. 13, 1995

[54] MACHINE-TOOL WITH MACHINING HEAD MOUNTED FOR MOVING ON A HORIZONTAL RAIL

[75] Inventor: Henri Line, Peymeinade, France

[73] Assignee: Helis, Peymeinade, France

[21] Appl. No.: 12,284

[22] Filed: Feb. 1, 1993

[30] Foreign Application Priority Data

Apr. 2, 1992 [FR] France ................ 92 01239

[51] Int. Cl.[6] .................................. B23Q 1/02
[52] U.S. Cl. ............................. 82/149; 408/235; 409/238
[58] Field of Search .......... 409/237, 238; 408/186, 408/235, 237; 82/132, 137, 149

[56] References Cited

U.S. PATENT DOCUMENTS

| | | | |
|---|---|---|---|
| 2,278,262 | 3/1942 | Hoelscher | 408/235 |
| 2,696,763 | 12/1954 | Daugherty et al. | 408/235 |
| 2,899,869 | 8/1959 | Daugherty | 409/237 |
| 3,656,860 | 4/1972 | Neuman | 409/238 |
| 3,761,194 | 9/1973 | Wagner | 409/238 |
| 3,862,586 | 1/1975 | Galbarini et al. | 408/235 |
| 4,520,700 | 6/1985 | Herzog et al. | 82/148 |

FOREIGN PATENT DOCUMENTS

| | | |
|---|---|---|
| 1163537 | 9/1958 | France . |
| 1214852 | 1/1957 | Germany . |
| 1552217 | 8/1969 | Germany . |
| 2715175 | 10/1978 | Germany . |
| 407661 | 9/1966 | Switzerland . |

*Primary Examiner*—William E. Terrell
*Attorney, Agent, or Firm*—Sheridan Ross & McIntosh

[57] ABSTRACT

A machine tool having torsional compensation for the machine tool support. Generally, a machine tool head is movably mounted on a cross member in such a way that it induces a torsional couple in the cross member. A mechanism is provided for inducing a torsional couple in the cross member which is substantially opposite to that produced by the supporting of the machine head. In one embodiment this mechanism is a tube which has one end rigidly interconnected with the cross member and another end which is movable relative to the cross member. A torsional force may be induced within the tube by movement of the second end relative to the cross rail and at least a portion of this torsional force is thereby transmitted to the cross member by the rigid interconnection of the first end of the tube with the cross member.

19 Claims, 1 Drawing Sheet

MACHINE-TOOL WITH MACHINING HEAD MOUNTED FOR MOVING ON A HORIZONTAL RAIL

FIELD OF THE INVENTION

The present invention is related to the field of machine-tools. More precisely, the invention relates to a machine-tool equipped with a machining head mounted on the front face of a rail and being movable longitudinally along that rail.

BACKGROUND OF THE INVENTION

In such a machine, the rail is fitted at its ends, either by fastening, or by wedging, or by guiding without play, on vertical columns.

The movable machining head, which can be a sliding drill head, or a boring slide, or a milling carriage, or a lathe slide, is generally guided by sliding ways placed on the front face of the rail.

During the displacement of the machining head, the rail becomes deformed, on the one hand, by bending since it has to support the weight of the machining head, and on the other hand, by twisting since it is subjected to a torsional couple which is equal to the product of the weight of the machining head and the distance separating the axis of the rail from the line of application of said weight. Such deformation affects the accuracy of the displacement of the machining head on the rail.

It is known that the deformation due to the torsional couple can be eliminated by fitting s balance weight which is fixed to the machining heed and placed on the other side of the rail, but the disadvantage of this solution is that it increases the weight of the machining head, increasing as s result the deformation due to bending.

FIELD OF THE INVENTION

It is the object of the present invention to improve the accuracy of movement of the machining head on the rail by virtually eliminating the deformation of the rail caused by the torsional couple without increasing the deformation due to bending.

This object is reached by the fact that a couple of forces is applied to the rail, which couple has the same value as the torsional couple exerted by the machining head, but is directionally opposite thereto and applied by static means provided in the rail.

The invention therefore relates to a machine-tool of the type comprising:
two vertical spaced apart columns,
a horizontal rail with two ends, both being fixed respectively on said two columns, and
a machining head mounted on said rail via guide means allowing its displacement along said rail,
said machining head being placed in facing relationship to said rail and exerting thereon a torsional couple under the action of its weight,
machine-tool wherein static means are further provided for exerting on said rail an antagonistic torsional couple of substantially the same value as the torsional couple exerted by the weight of said machining head on said rail, but directionally opposite thereto, said static means being disposed inside said rail.

Advantageously, the static means for exerting the antagonistic torsional couple comprise at least one tube extending along the axis of said rail and being subjected to a torsional force, said tube having a first portion which is fast with the median part of said rail and at least a second portion embedded in one of the ends of said rail.

Preferably, one of said tube portions is mounted on said rail so as to be pivotable; means being provided between said rail and said tube portion for adjusting the torsional force exerted on said tube.

Preferably, said rail comprises in its median part, a transversal plate, and the static means for exerting the antagonistic torsional couple comprise at least one tube which extends along the axis of said rail and is subjected to a torsional force, said tube having a first end fixed on said transversal plate and a second end fitted in a pivotable manner in one of the ends of said rail with interposition of means for controlling the torsional force exerted on said tube.

Advantageously, the means for controlling the torsional force exerted on said tube comprise a control screw cooperating with a lever arm.

BRIEF DESCRIPTION OF THE DRAWINGS

The invention will be more readily understood on reading the following description given with reference to the accompanying drawings, in which.

DETAILED DESCRIPTION OF A PREFERRED EMBODIMENT

Figure 1:
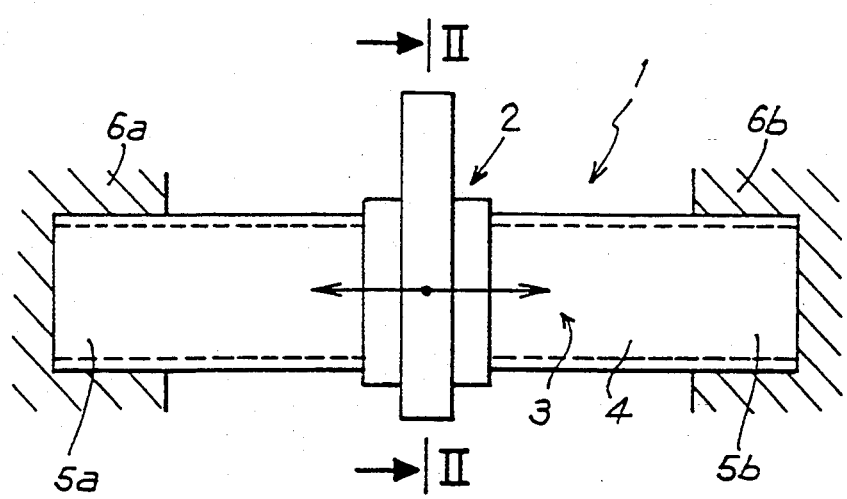
FIG. 1 is a front view of the machine-tool according to the invention.
Figure 2:
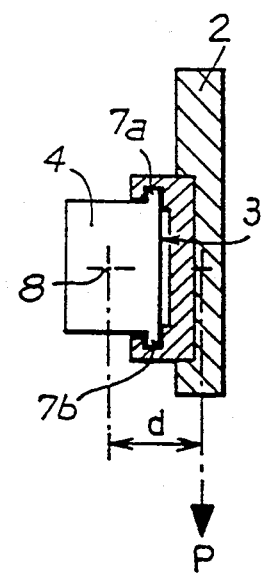
FIG. 2 is across-section along line II—II of FIG. 1.

The drawing shows a machine-tool 1 comprising a machining head 2 disposed on the front face 3 of a rail 4 of which the ends 5a, 5b are respectively fitted in vertical columns 6a, 6b, either by fastening, or by wedging, or by guiding without play. The machining head 2 is guided by horizontal sliding ways 7a, 7b provided on the front face 3 of the rail 4. The machining head 2 of weight P exerts on the rail 4 a torsional couple which is equal to the product of the weight P and the distance d separating the axis 8 of the rail 4 from the line of application of the weight P.

Figure 3:
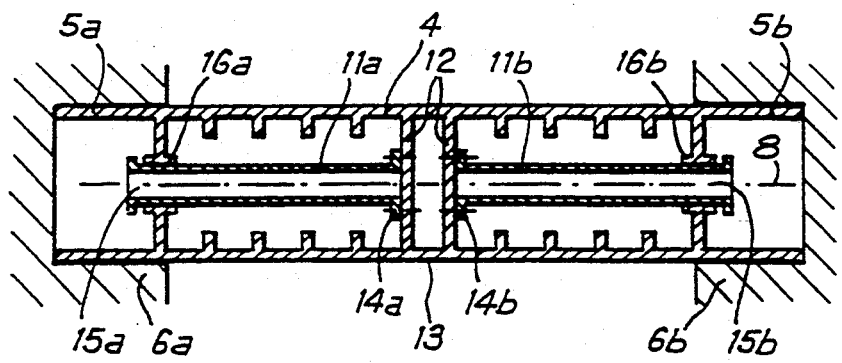
FIG. 3 is a longitudinal section of the rail equipped with static means for exerting an antagonistic torsional couple.
Figure 4:
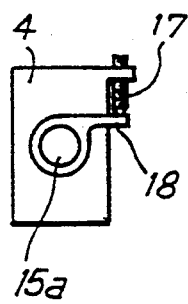
FIG. 4 is a side view of the rail.

As clearly illustrated in FIGS. 3 and 4, the rail 4 is equipped with two tubes 11a, 11b which exert thereon a couple of forces which is directionally opposite to the torsional couple exerted by the weight P of the machining head 2. The two tubes 11a, 11b extend along the axis 8 of the rail 4 and they are disposed on either side of at least one transversal plate 12 provided in the median part 13 of the rail 4. The first ends 14a, 14b of the two tubes 11a, 11b are fixed on the transversal plate or plates 12 by welding or by any other method. The tube portions 15a, 15b adjacent the other ends of the tubes 11a, 11b are carried by support bearings 16a, 16b mounted on the ends 5a, 5b of the rail 4 so as to allow the pivoting movement of tubes 11a, 11b with respect to the rail 4. The torsional force is exerted on tube portions 15a, 15b via control screws 17 which are in resting contact on radial lever arms 18 fixed respectively on the tube portions 15a, 15b. The control screws 17 are carried by the rail 4 and are placed in such a way as to be accessible in order to allow the control of the antagonistic couple exerted on each one of the tubes 11a, 11b.

The antagonistic couple exerted by the two tubes 11a, 11b has a value which is substantially equal to the couple exerted by the weight P of the machining head 2, but it is directionally opposite thereto. In practice, the correction couple will be controlled by placing the machining head 2 in the median part 13 of the rail 4, and by controlling that said head returns to the vertical position by using a precision level.

In the abovedescribed embodiment, two tubes 11a, 11b are provided. But it is obviously possible to obtain the same results with only one tube, for example 11a, which would, on its own, exert the antagonistic couple. Also, the two tubes 11a, 11b can be replaced by only one tube extending throughout the length of the rail 4, one opening being then provided to allow the passage of the tranversal plates 12. The tubes 11a, 11b can also be fixed to the ends 5a, 5b of the rail 4, the means for controlling the twisting force exerted on the tubes 11a, 11b being then provided close to the median part 13 of the rail 4.

What is claimed is:

1. A machine tool comprising:
   two vertical support columns;
   a cross rail with two ends, both being fixed respectively on said two columns;
   a machine head movably mounted on said cross rail, said machine head exerting a first torsional couple under the action of its weight on said cross rail; and
   torsion means for applying a second torsional couple to said cross rail which is substantially opposite said first torsional couple, said torsion means comprising a first torsion member disposed inside said rail having a first portion secured to said cross rail, said torsion means inducing a torque in said first torsion member which is transmitted at least in part to said cross rail.

2. The machine tool of claim 1, wherein said first torsion member includes a second portion displaced from said first portion, and wherein said torsion means further comprises a lever arm secured to said second portion of said first torsion member.

3. The machine tool of claim 2, wherein said torsion means further comprises engaging means for engaging said lever arm and providing a force thereto.

4. The machine tool of claim 3, wherein said engaging means is adjustable to thereby vary the force applied by said engaging means to said lever arm.

5. The machine tool of claim 1, wherein a longitudinal extent of said first torsion member is substantially parallel to a longitudinal extent of said cross rail.

6. The machine tool of claim 5, wherein said first torsion member extends within and along an axis of said cross rail.

7. The machine tool of claim 1, wherein said cross rail comprises a mounting flange in a portion thereof for allowing securement of said first portion of said first torsion member thereto.

8. The machine tool of claim 7, wherein said torsion means further comprises a second torsion member having a first portion secured to said mounting flange, said torsion means inducing a torque in said second torsion member which is transmitted at least in part to said cross rail, said first and second torsion members extending from opposing sides of said mounting flange.

9. The machine tool of claim 1, wherein said first torsion member is tubular.

10. A machine tool comprising:
    two vertical support columns;
    a cross rail with two ends, both being fixed respectively on said two columns;
    a machine head movably mounted on said cross rail, said machine head exerting a first torsional couple under the action of its weight on said cross rail; and
    a torque member disposed inside said rail for exerting on said cross rail a second torsional couple which is substantially opposite to said first torsional couple, said torque member extending substantially parallel with said cross rail and having a first portion which is fixedly secured to a part of said cross rail and a second portion displaced from said first portion.

11. The machine tool of claim 10, wherein said second portion is rotatably interconnected with said cross rail, and wherein said machine tool further comprises means for adjusting said second torsional couple.

12. The machine tool of claim 11, wherein said means for adjusting comprises a control screw mounted on said cross rail and a lever arm fixed on said torque member.

13. A machine tool comprising:
    two vertical support columns;
    a cross rail with two ends, both being fixed respectively on said two columns; said cross rail comprising a mounting plate;
    a machine head movably mounted on said cross rail, said machining head exerting a first torsional couple under the action of its weight on said cross rail;
    a first torque member disposed inside said rail comprising a first end fixed on said mounting plate and a second end movable relative to said cross rail; and
    means for introducing a torsional force to said first torque member which is transmitted at least in part to said cross rail and is substantially opposite to said first torsional couple.

14. The machine tool of claim 13, wherein said means for introducing comprises a control screw mounted on said cross rail and a lever arm fixed on said first torque member.

15. The machine tool of claim 13, further comprising a second torque member having a first end fixed on said mounting plate and a second end movable relative to said cross rails said first and second torque members extending from opposite sides of said mounting plate;
    means for introducing a torsional force to said second torque member which is transmitted at least in part to said cross rail and is substantially opposite to said first torsional couple.

16. A machine-tool of the type comprising:
    two vertical spaced apart columns;
    a horizontal rail with two ends, both being fixed respectively on said two columns;
    a machining head mounted on said rail via guide means allowing its displacement along said rail, said machining head being placed in facing relationship to said rail and exerting thereon a torsional couple under the action of its weight; and
    means, disposed inside said rail, for exerting an antagonistic torsional couple on said rail which is of substantially the same value as said torsional couple exerted by said weight of said machining head on said rail, but directionally opposite thereto, said means for exerting comprising at least one tube extending along an axis of said rail and being subjected to a torsional force, said tube having a first portion which is fast with a median part of said rail and a second portion embedded in one of said ends of said rail, wherein said second portion is mounted on said rail so as to be pivotable, and wherein said means for exerting further comprises controlling means, between said rail and said tube, for adjusting the torsional force exerted on said tube, wherein said controlling means comprises a lever arm and a cooperating control screw.

17. The machine-tool of claim 16, wherein said lever arm is fixed on said tube and said control screw is mounted on said rail.

18. A machine-tool of the type comprising:
two vertical spaced-apart columns;
a horizontal rail with two ends, both being fixed respectively on said two columns, said rail comprising a transverse plate in a median part thereof;
a machining head mounted on said rail via guide means allowing its displacement along said rail, said machining head being placed in facing relationship to said rail and exerting thereon a torsional couple under the action of its weight; and
means, disposed inside said rail, for exerting an antagonistic torsional couple on said rail of substantially the same value as said torsional couple exerted by said weight of said machining head on said rail, but directionally opposite thereto, said means for exerting comprising at least one tube extending along an axis of said rail and being subjected to a torsional force and means for controlling said torsional force in said at least one tube, said tube having a first end fixed on said transverse plate and a second end fitted in a pivotable manner in one of the ends of said rail with interposition of said means for controlling, said means for controlling comprising a lever arm fixed on said tube and a control screw mounted on said rail.

19. A machine-tool of the type comprising:
two vertical spaced-apart columns;
a horizontal rail with two ends, both being fixed respectively on said two columns, said rail including a transverse plate in a median part thereof;
a machining head mounted on said rail via guide means allowing its displacement along said rail, said machining head being placed in facing relationship to said rail and exerting thereon a torsional couple under the action of its weight; and
means, disposed inside said rail, for exerting on said rail an antagonistic torsional couple of substantially the same value as said torsional couple exerted by said weight of said machining head on said rail, but directionally opposite thereto, said means for exerting comprising two tubes extending along an axis of said rail, being subjected to a torsional force, and being positioned on opposite sides of said plate, said tubes each having a first end fixed on said transverse plate and a second end fitted in a pivotable manner in one of the ends of said rail, said means for exerting further comprising controlling means for controlling said torsional force exerted on said tubes.

* * * * *